United States Patent
Sano

(10) Patent No.: US 11,252,328 B2
(45) Date of Patent: Feb. 15, 2022

(54) ELECTRONIC DEVICE AND METHOD FOR CONTROLLING THE SAME

(71) Applicant: CANON KABUSHIKI KAISHA, Tokyo (JP)

(72) Inventor: Genjiro Sano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 16/781,497

(22) Filed: Feb. 4, 2020

(65) Prior Publication Data

US 2020/0260004 A1    Aug. 13, 2020

(30) Foreign Application Priority Data

Feb. 8, 2019  (JP) .............................. JP2019-021703

(51) Int. Cl.
  *H04N 5/232*      (2006.01)
  *G06T 7/33*       (2017.01)
  *H04N 5/265*      (2006.01)

(52) U.S. Cl.
  CPC ........... *H04N 5/23238* (2013.01); *G06T 7/33* (2017.01); *H04N 5/265* (2013.01)

(58) Field of Classification Search
  CPC ..... G06T 7/33; G06T 3/4038; H04N 5/23238; H04N 5/265; H04N 5/232
  See application file for complete search history.

(56) References Cited

U.S. PATENT DOCUMENTS

| | | | | |
|---|---|---|---|---|
| 5,990,941 | A * | 11/1999 | Jackson | G06T 3/0062 348/207.99 |
| 7,382,399 | B1 * | 6/2008 | McCall | H04N 5/2259 348/207.99 |
| 2017/0257576 | A1 * | 9/2017 | Mitsui | H04N 5/23293 |
| 2018/0276722 | A1 * | 9/2018 | Fujita | G06F 3/04815 |
| 2019/0132521 | A1 * | 5/2019 | Fujita | H04N 5/23238 |
| 2019/0206013 | A1 * | 7/2019 | Okuyama | H04N 9/8205 |

FOREIGN PATENT DOCUMENTS

JP    2013-187860 A    9/2013

* cited by examiner

*Primary Examiner* — Dakshesh D Parikh
(74) *Attorney, Agent, or Firm* — Cowan, Liebowitz & Latman, P.C.

(57) ABSTRACT

An electronic device includes an acquisition unit configured to acquire a first half-celestial sphere image; a generation unit configured to generate a second half-celestial sphere image by horizontally or vertically inverting the first half-celestial sphere image; a combining unit configured to generate an entire-celestial sphere image by connecting the first half-celestial sphere image and the second half-celestial sphere image together; and a recording unit configured to record the generated entire-celestial sphere image on a recording memory.

12 Claims, 9 Drawing Sheets

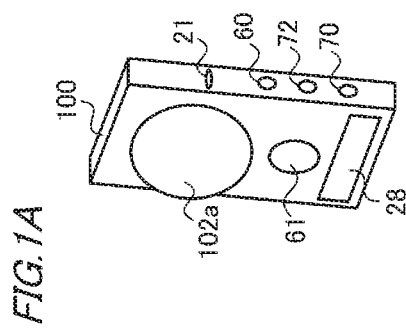
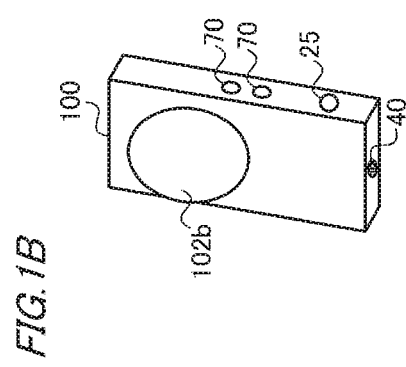

ELECTRONIC DEVICE AND METHOD FOR CONTROLLING THE SAME

BACKGROUND OF THE INVENTION

Field of the Invention

The present invention relates to an electronic device and a method for controlling the electronic device.

Description of the Related Art

In recent years, an image capturing apparatus capable of capturing an image of which video is wider than the view angle of a human such as an omnidirectional image and an entire-celestial sphere image, for example, a virtual reality (VR) image has become popular.

For example, Japanese Patent Application Laid-open No. 2013-187860 describes a feature of generating a 360-degree image by combining a plurality of captured images each having an angle of view of at least 180 degrees captured by a plurality of image capturing elements.

An entire-celestial sphere image capturing apparatus capable of capturing an entire-celestial sphere image can display a captured image corresponding to the gaze direction of a viewer for every direction and enhance the immersive feeling of the viewer by reproducing the entire-celestial sphere image with use of an apparatus such as a head up display capable of performing VR display.

However, the image capturing range of the entire-celestial sphere image capturing apparatus is wider than the view angle of a human. Therefore, objects that are not in the field of vision of a user at the time of capturing are included in an image capturing range, and hence unnecessary objects that are not intended by the user may be captured. In this case, editing for to erasing and blurring out unintended objects has been time consuming for the user.

Thus, the following method is conceived. A half-celestial sphere image close to the view angle of the human is captured and recorded by the entire-celestial sphere image capturing apparatus, to thereby exclude unnecessary objects unintended by the user. Then, adjustment is performed so that the periphery of an object to be captured by the user becomes the image capturing range. However, the half-celestial sphere image only displays the captured image corresponding to some directions out of directions to which the viewer can change the gaze thereof, and hence there may be a lack of the immersive feeling as compared to the entire-celestial sphere image.

SUMMARY OF THE INVENTION

In view of the abovementioned problem, an object of the present invention is to generate an entire-celestial sphere image that provides a high immersive feeling by connecting captured images together.

In order to solve the abovementioned problem, an electronic device of the present invention includes an acquisition unit configured to acquire a first half-celestial sphere image; a generation unit configured to generate a second half-celestial sphere image by horizontally or vertically inverting the first half-celestial sphere image; a combining unit configured to generate an entire-celestial sphere image by connecting the first half-celestial sphere image and the second half-celestial sphere image together; and a recording unit configured to record the generated entire-celestial sphere image on a recording memory.

Further features of the present invention will become apparent from the following description of exemplary embodiments with reference to the attached drawings.

BRIEF DESCRIPTION OF THE DRAWINGS

FIG. 1A to FIG. 1C are external views and a block diagram of a digital camera;

FIG. 2A to FIG. 2C are external views and a block diagram of a display control apparatus and the like;

DESCRIPTION OF THE EMBODIMENTS

Embodiment 1

Figure 1C:
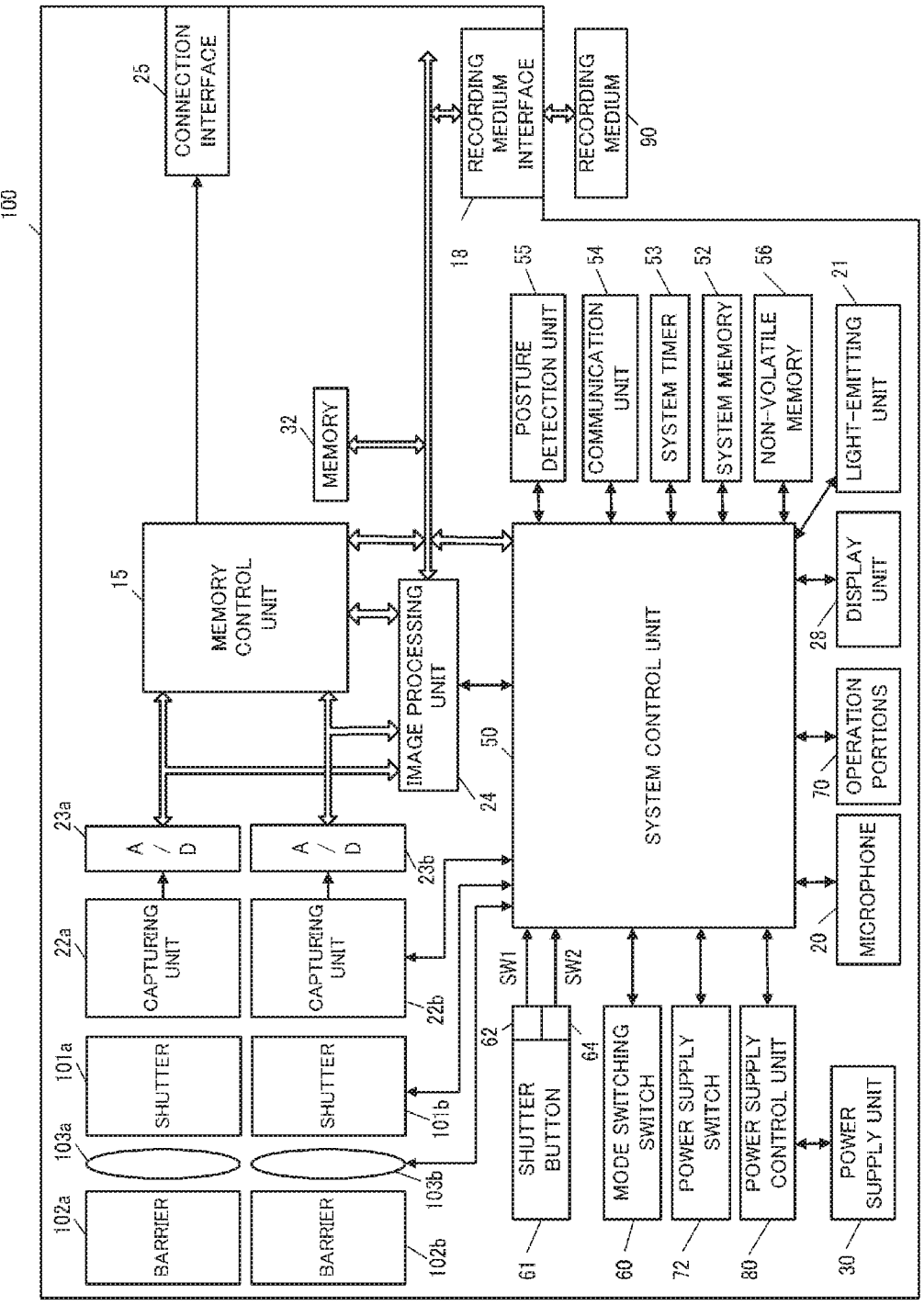

Preferable embodiments of the present invention are described below with reference to the accompanying drawings. FIG. 1A is a front perspective view (external view) of a digital camera 100 (image capturing apparatus) that is an electronic device. FIG. 1B is a rear perspective view (external view) of the digital camera 100. The digital camera 100 is an omni-directional camera (entire-celestial sphere camera).

A barrier 102a is a protective window for a front camera unit of which capturing range is a place on the front side of the digital camera 100. The front camera unit is a wide-angle camera unit of which capturing range is a wide range that is at least 180 degrees to the vertical and horizontal directions on the front side of the digital camera 100, for example. A barrier 102b is a protective window for a rear camera unit of which capturing range is a place on the rear side of the digital camera 100. The rear camera unit is a wide-angle camera unit of which capturing range is a wide range that is at least 180 degrees to the vertical and horizontal directions on the rear side of the digital camera 100, for example.

A display unit 28 displays various information, A shutter button 61 is an operation portion (operation member) for issuing a capturing instruction. A mode switching switch 60 is an operation portion for switching various modes. A connection I/F 25 is a connector for connecting a connection cable to the digital camera. 100, and external devices such as a smartphone, a personal computer, and a television are connected to the digital camera 100 with use of the connection cable. Operation portions 70 are various switches, buttons, dials, touch sensors, and the like that receive various operations from the user. A power supply switch 72 is a push button for switching ON/OFF of the power supply.

A light-emitting unit 21 is a light-emitting member such as a light-emitting diode (LED), and notifies the user of various states of the digital camera 100 with light-emitting patterns and light-emitting colors. A fixing portion 40 is a tripod screw hole, for example, and is used for fixing and installing the digital camera 100 by a fixing device such as a tripod.

FIG. 1C is a block diagram illustrating a configuration example of the digital camera 100.

The barrier 102a prevents dirt and damage on capturing systems (a capturing lens 103a, a shutter 101a, a capturing unit 22a, and the like) of the front camera unit by covering the capturing systems. The capturing lens 103a is a lens group including a zoom lens and a focus lens and is a wide-angle lens. The shutter 101a is a shutter having a diaphragm function for adjusting the amount of object light entering the capturing unit 22a. The capturing unit 22a is an image capturing element (image sensor) formed by a CCD, a CMOS element, and the like that convert an optical image to an electrical signal. An A/D converter 23a converts an analog signal output from the capturing unit 22a to a digital signal. The outer surface of the capturing lens 103a may be exposed by not providing the barrier 102a, and dirt and damage on other capturing systems (the shutter 101a and the capturing unit 22a) may be prevented by the capturing lens 103a.

The barrier 102b prevents dirt and damage on capturing systems (a capturing lens 103b, a shutter 101b, a capturing unit 22h, and the like) of the rear camera unit by covering the capturing systems. The capturing lens 103b is a lens group including a zoom lens and a focus lens, and is a wide-angle lens. The shutter 101b is a shutter having a diaphragm function for adjusting the amount of object light entering the capturing unit 22b, The capturing unit 22b is an image capturing element formed by a CCD, a CMOS element, and the like that convert an optical image to an electrical signal. An A/D converter 23b converts an analog signal output from the capturing unit 22b to a digital signal. The outer surface of the capturing lens 103b may be exposed by not providing the barrier 102b, and dirt and damage on other capturing systems shutter 101b and the capturing unit 22b) may be prevented by the capturing lens 103b.

By the capturing unit 22a and the capturing unit 22b, a virtual reality (VR) image is captured. The VR image is an image that can perform VR display (display in a display mode "VR view"). The VR image includes an omnidirectional image (entire-celestial sphere image) captured by the omni-directional camera (entire-celestial sphere camera) and a panorama image having a wider video range (effective video range) than a display range that can be displayed on the display unit at a time. The VR image includes a moving image and a live view image (an image acquired from the camera in almost real time) in addition to a still image. The VR image has a video range (effective video range) for the field of view of 360 degrees in the vertical direction (the vertical angle, the angle from the zenith, the angle of elevation, the angle of depression, the elevation angle, the pitch angle) and 360 degrees in the horizontal direction (the horizontal angle, the azimuth angle, the yaw angle) at maximum.

The VR image also includes an image having a wide angle of view (range of field of view) wider than the angle of view that can be captured by a normal camera or a video range (effective video range) wider than the display range that can be displayed on the display unit at a time even when the angle of view or the video range is less than 360 degrees in the vertical direction and less than 360 degrees in the horizontal direction. For example, an image captured by an entire-celestial sphere camera capable of capturing objects for a field of view (angle of view) of 360 degrees in the horizontal direction (the horizontal angle, the azimuth angle) and a vertical angle of 210 degrees with respect to the zenith serving as the center is one kind of VR image. For example, an image captured by a camera that can capture objects for the field of view (angle of view) of 180 degrees in the horizontal direction (the horizontal angle, the azimuth angle) and a vertical angle of 180 degrees with respect to the horizontal direction serving as the center is one kind of VR image. In other words, an image having a video range for a field of view of at least 160 degrees (±80 degrees) in the vertical direction and the horizontal direction and a wider video range than a range that can be visually recognized by a human at a time is one kind of VR image.

When the VR image is VR-displayed (displayed in the display mode "VR view"), an omnidirectional video seamless in the horizontal direction (horizontal rotation direction) can be viewed by changing the posture of a display apparatus (a display apparatus that displays the VR image) to the horizontal rotation direction. For the vertical direction (vertical rotation direction), a seamless omnidirectional video can be viewed in a range of +105 degrees from an overhead place (zenith), but a range exceeding 105 degrees from the overhead place is a blank region in which a video does not exist. The VR image can be said to be "an image of which video range is at least a part of a virtual space (VR space)".

The VR display (VR view) is a display method (display mode) capable of changing the display range that displays a video with the range of field of view in accordance with the posture of the display apparatus out of the VR image. When viewing is performed by wearing a head mounted display (HMD) that is a display apparatus, a video with the range of field of view in accordance with the direction of the face of the user is displayed. For example, a video with a view angle (angle of view) of which center is 0 degrees (a predetermined azimuth, for example, north) in the horizontal direction and 90 degrees (90 degrees from the zenith, that is, horizontal) in the vertical direction out of the VR image is displayed at a certain point of time. When the posture of the display apparatus is inverted to the other way round (for example, when the display surface is changed to face north from south) from this state, the display range is changed to a video with a view angle of which center is 180 degrees (the opposite azimuth, for example, south) in the horizontal direction and 90 degrees (horizontal direction) in the vertical direction out of the same VR image. Regarding a case where the user is viewing the HMD, the video displayed on the HMD changes from a video of north to a video of south when the user changes the direction of the face from north to south (in other words, when the user turns around). By the VR display as above, a feeling (immersive feeling) of visually being in the VR image (in the VR space) can be provided to the user. A smartphone mounted on VR goggles (head mounted adapter) can be said to be one kind of HMD.

The method for displaying the VR image is not limited to the above. The display range does not necessarily need to be moved (scrolled) in accordance with the posture change and may be moved (scrolled) in accordance with the user operation on a touch panel, a direction button, and the like. At the time of the VR display (when the display mode is "VR view"), the display range may be changeable in accordance with the Touch-Move onto the touch panel, the dragging operation with use of a mouse and the like, the pushing of the direction button, and the like in addition to the change of the display range in accordance with the posture change.

An image processing unit 24 performs predetermined pixel interpolation, resizing processing such as reduction, and color convert processing on data from the A/D converter 23a or the A/D converter 23b or data from a memory control unit 15. The image processing unit 24 performs predetermined calculation processing with use of captured image data. A system control unit 50 performs exposure control and ranging control on the basis of the calculation result acquired by the image processing unit 24. As a result, through-the-lens (TTL) autofocus (AF) processing, automatic exposure (AE) processing, flash pre-emission (EF) processing, and the like are performed. The image processing unit 24 further performs predetermined calculation processing with use of the captured image data, and performs TTL auto white balance (AWB) processing on the basis of the acquired calculation result. The image processing unit 24 performs basic image processing on two images (two fisheye images; two wide-angle images) acquired from the A/D converter 23a and the A/D converter 23b, and performs image connecting processing that combines two images on which the basic image processing has been performed, to thereby generate a single VR image. At the time of VR displaying or reproducing in live view, the image processing unit 24 performs image trimming processing, enlarging processing, distortion correction, and the like for performing VR display of the VR image, and renders the processing result to a VRAM of a memory 32.

In the image connecting processing, the image processing unit 24 uses one of the two images as a reference image and the other thereof as a comparison image, and calculates the deviation amount between the reference image and the comparison image for each area by pattern matching processing. Then, the image processing unit 24 detects the connecting position at which the two images are to be connected together on the basis of the deviation amount for each area. The image processing unit 24 converts the images to entire-celestial-sphere-form (entire-celestial-sphere-image-form) images by correcting the distortion in the images by geometric transformation by taking the detected connecting position and lens characteristics of the optical systems into consideration. Then, the image processing unit 24 generates one entire-celestial sphere image (VR image) by combining (blending) the two entire-celestial-sphere-form images. The generated entire-celestial sphere image is an image using equidistant cylindrical projection, for example, and the positions of the pixels of the entire-celestial sphere image can be associated with the coordinates on the front surface of a sphere (VR space).

The output data from the A/D converters 23a and 23b is written into the memory 32 via the image processing unit 24 and the memory control unit 15 or not via the image processing unit 24 and via the memory control unit 15. The memory 32 stores therein image data acquired by the capturing units 22a and 22b and converted into digital data by the A/D converters 23a and 23b, and image data to be output to an external display from the connection I/F 25. The memory 32 has a storage capacity sufficient for storing therein a predetermined number of still images and a predetermined time of moving images and sound.

The memory 32 also serves as a memory (video memory) for image display. The data for image display stored in the memory 32 can be output to an external display from the connection I/F 25. By successively transmitting VR images that are captured by the capturing units 22a and 22b, generated by the image processing unit 24, and accumulated in the memory 32 to the external display and displaying the VR images on the external display, a function as an electronic view finder can be realized and live view display (LV display) can be performed. The image displayed by live view display is hereinafter referred to as a live view image (LV image). Live view display (remote LV display) can also be performed by transmitting the VR images accumulated in the memory 32 to external devices (a smartphone and the like) that are wirelessly connected thereto via a communication unit 54 and displaying the VR images on the external device side.

A non-volatile memory 56 is a memory serving as a recording medium capable of performing electrical erasure and recording, and is an EEPROM, for example. In the non-volatile memory 56, constants, programs, and the like for the operation of the system control unit 50 are recorded. The programs herein are computer programs for executing various processing.

The system control unit 50 is a control unit including at least one processor or circuit, and controls the entire digital camera 100, The system control unit 50 realizes each processing by executing the programs recorded on the abovementioned non-volatile memory 56. A system memory 52 is a RAM, for example, and constants, variables, programs read out from the non-volatile memory 56, and the like for the operation of the system control unit 50 are expanded in the system memory 52. The system control unit 50 also performs display control by controlling the memory 32, the image processing unit 24, the memory control unit 15, and the like. A system timer 53 is a clocking unit that measures the time used in various controls and the time of a built-in clock.

The mode switching switch 60, the shutter button 61, the operation portions 70, and the power supply switch 72 are used to input various operation instructions to the system control unit 50.

The mode switching switch 60 can switch the operation mode of the system control unit 50 to any of a still image recording mode, a moving image capturing mode, a reproducing mode, a communication connecting mode, and the like. Modes included in the still image recording mode include an automatic capturing mode, an automatic scene determining mode, a manual mode, a diaphragm prioritized mode (Av mode), a shutter speed prioritized mode (Tv mode), and a program AE mode. There are also various scene modes in which capturing settings for different capturing scenes are provided, custom modes, and the like. The user can directly switch the mode to one of the modes by the mode switching switch 60. Alternatively, the screen may be temporarily switched to a list screen of the capturing modes by the mode switching switch 60, and then the mode may be selectively switched to one of the plurality of modes displayed on the display unit 28 with use of another operation member. Similarly, the moving image capturing mode may include a plurality of modes.

The shutter button 61 includes a first shutter switch 62 and a second shutter switch 64. The first shutter switch 62 is turned ON in the middle of the operation of the shutter button 61, that is, with a so-called half push (capturing preparing instruction), and generates a first shutter switch signal SW1. The system control unit 50 starts capturing preparing operations such as autofocus (AF) processing, automatic exposure (AE) processing, auto white balance (AWB) processing, and flash pre-emission (EF) processing by the first shutter switch signal SW1. The second shutter switch 64 is turned ON when the operation of the shutter button 61 finishes, that is, with a full push (capturing instruction), and generates a second shutter switch signal SW2. The system control unit 50 starts the operation of a series of capturing processing from when the signals from the capturing units 22a and 22b are read out to when the image data is written into a recording medium 90 by the second shutter switch signal SW2.

The shutter button 61 is not limited to an operation member with which two stages of operation, that is, the full push and the half push can be performed, and may be an operation member with which only one stage of pushing can be performed. In this case, the capturing preparing operation and the capturing processing are performed in succession by one stage of pushing. The operation is the same as the operation performed when the shutter button with which the half push and the full push can be performed is fully pushed (when the first shutter switch signal SW1 and the second shutter switch signal SW2 are almost simultaneously generated).

Functions are allocated, as appropriate, to the operation portions 70 for each scene by selecting and operating various function icons and choices displayed on the display unit 28, for example, and the operation portions 70 function as various function buttons. The function buttons include an ending button, a return button, an image feeding button, a jump button, a narrowing-down button, and an attribute change button, for example. For example, when a menu button is pushed, a menu screen on which various settings can be performed is displayed on the display unit 28. The user can intuitively perform various settings by operating the operation portions 70 while looking at the menu screen displayed on the display unit 28.

The power supply switch 72 is a push button for switching ON/OFF of the power supply. The power supply control unit 80 includes a battery detection circuit, a DC-DC converter, a switch circuit that can switch blocks that carry current, and the like, and detects whether a battery is mounted, the type of the battery, the battery charge, and the like. The power supply control unit 80 controls the DC-DC converter on the basis of the detection results and instructions from the system control unit 50, and supplies necessary voltage to units including the recording medium 90 for a necessary period of time. The power supply unit 30 includes a primary battery such as an alkaline battery and a lithium battery, a secondary battery such as a NiCd battery, a NiMH battery, and a Li battery, and an AC adapter.

A recording medium I/F 18 is an interface for the recording medium 90 such as the memory card and a hard disk. The recording medium 90 is a recording medium such as a memory card for recording a captured image thereon, and includes a semiconductor memory, an optical disk, and a magnetic disk. The recording medium 90 may be an exchangeable recording medium that is removably mounted on the digital camera 100, or may be a recording medium built in the digital camera 100.

The communication unit 54 transmits and receives video signals, sound signals, and the like to and from external devices wirelessly connected thereto or connected thereto by a wired cable. The communication unit 54 can also be connected to a wireless local area network (LAN) or the Internet. The communication unit 54 can transmit images (including LV images) captured by the capturing units 22a and 22b and images recorded on the recording medium 90, and can receive images and other various information from the external devices.

A posture detection unit 55 detects the posture of the digital camera 100 with respect to the direction of gravity. Whether the image captured by the capturing units 22a and 22b is an image captured by horizontally holding the digital camera 100 or an image captured by vertically holding the digital camera 100 can be determined on the basis of the posture detected by the posture detection unit 55. The degree by which the digital camera 100 has been tilted in three-axis directions (rotation directions), that is, the yaw direction, the pitch direction, and the roll direction to obtain the image captured by the capturing units 22a and 22b can be determined. The system control unit 50 can add orientation information in accordance with the posture detected by the posture detection unit 55 to an image file of the VR image captured by the capturing units 22a and 22b, and record the images after rotating (adjusting the orientation of the image so as to perform tilt correction (zenith correction)) the image. One sensor or a combination of a plurality of sensors out of an accelerometer, a gyro sensor, a geomagnetic sensor, an azimuth sensor, an altitude sensor, and the like can be used as the posture detection unit 55. The movement (whether the digital camera 100 is panning, tilted, lifted, or still, for example) of the digital camera 100 can also be detected with use of the accelerometer, the gyro sensor, the azimuth sensor, and the like forming the posture detection unit 55.

A microphone 20 is a microphone that collects sounds around the digital camera 100 that are recorded as the sound of the VR image that is a moving image (VR moving image). The connection I/F 25 is a connecting plug to which an HDMI (registered trademark) cable, a USB cable, and the like to be connected to external devices for transmitting and receiving videos are connected.

Figure 2A:
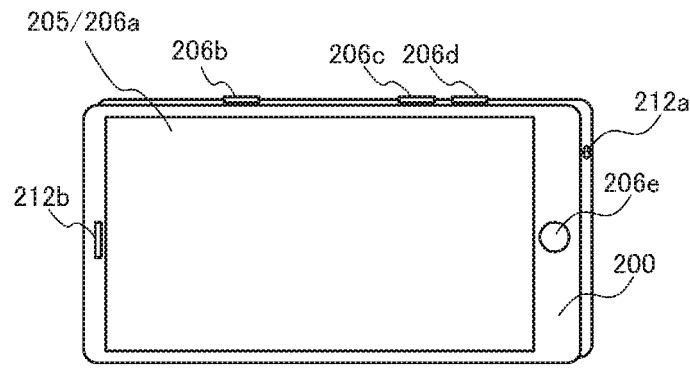

FIG. 2A is an external view of a display control apparatus 200 that is one kind of electronic device. The display control apparatus 200 is a display apparatus such as a smartphone. A display 205 is a display unit that displays images and various information. The display 205 is integrally formed with a touch panel 206a, and can detect touch operation onto a display surface of the display 205. The display control apparatus 200 can perform VR display of the VR image (VR content) on the display 205. An operation portion 206b is a power supply button that receives the operation of switching ON and OFF of the power supply of the display control apparatus 200. An operation portion 206c and an operation portion 206d are volume buttons that raises or lowers the volume of the sound output from a speaker 212b, an earphone or an external speaker connected to a sound output terminal 212a, and the like. An operation portion 206e is a home button for displaying a home screen on the display 205. The sound output terminal 212a is an earphone jack, and is a terminal that outputs sound signals to the earphone, the external speaker, and the like. The speaker 212b is a speaker with a built-in body that outputs sound.

Figure 2B:
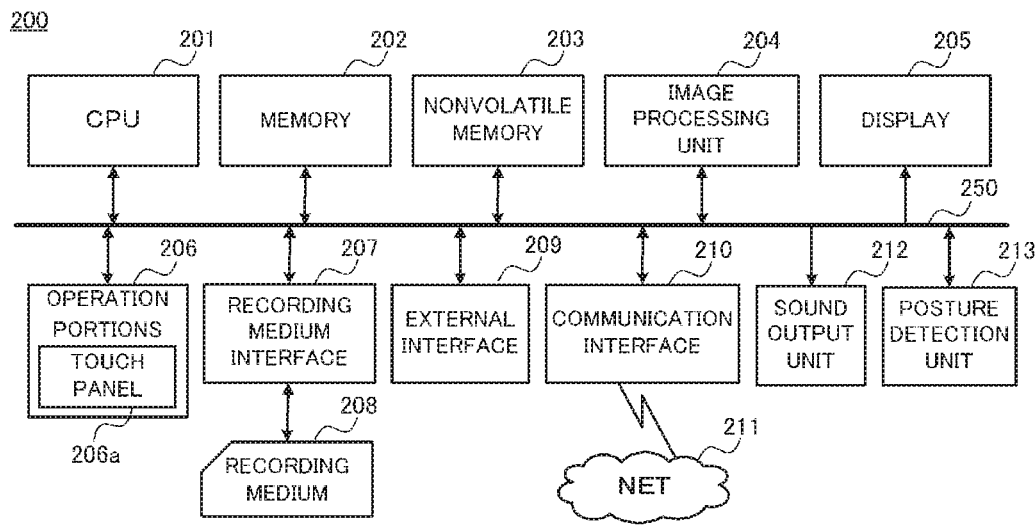

FIG. 2B is a block diagram illustrating a configuration example of the display control apparatus 200. A CPU 201, a memory 202, a non-volatile memory 203, an image processing unit 204, the display 205, operation portions 206, a recording medium I/F 207, an external I/F 209, and a communication I/F 210 are connected to an internal bus 250. A sound output unit 212 and a posture detection unit 213 are also connected to the internal bus 250. The units connected to the internal bus 250 can exchange data via the internal bus 250.

The CPU 201 is a control unit that controls the entire display control apparatus 200, and includes at least one processor or circuit. The memory 202 includes a RAM (a volatile memory using a semiconductor device and the like), for example. The CPU 201 controls the units of the display control apparatus 200 by using the memory 202 as a work memory in accordance with a program stored in the non-volatile memory 203, for example. The non-volatile memory 203 stores therein image data, sound data, other data, various programs to be operated by the CPU 201, and the like. The non-volatile memory 203 includes a flash memory and a ROM, for example.

The image processing unit 204 performs various image processing on images stored in the non-volatile memory 203 and the recording medium 208, video signals acquired via the external I/F 209, images acquired via the communication I/F 210, and the like on the basis of the control of the CPU 201. The image processing performed by the image processing unit 204 includes A/D conversion processing, D/A conversion processing, encoding processing, compression processing, decoding processing, enlarging/reduction processing (resizing), noise reduction processing, and color conversion processing for the image data. Various image processing such as panorama expansion, mapping processing, and conversion of an omnidirectional image or a VR image that is a wide range image having a wide range video if not omnidirectional are also performed. The image processing unit 204 may include dedicated circuit blocks for performing specific image processing. The CPU 201 can also perform image processing in accordance with a program without using the image processing unit 204 depending on the type of the image processing.

The display 205 displays a GUI screen that forms images and a graphical user interface (GUI) and the like on the basis of the control of the CPU 201. The CPU 201 generates display control signals in accordance with a program and controls the units of the display control apparatus 200 to generate video signals for causing the display 205 to perform display and to output the video signals to the display 205. The display 205 displays a video on the basis of the generated and output video signals. The configuration included in the display control apparatus 200 itself may end at the interface for outputting the video signals for causing the display 205 to perform display, and the display 205 may be formed by an external monitor (a television, an HMD, and the like).

The operation portions 206 are input devices for receiving the user operation including character information input devices such as a keyboard, pointing devices such as a mouse and a touch panel, buttons, dials, joy sticks, touch sensors, and touchpads. In this embodiment, the operation portions 206 include the touch panel 206a, and the operation portions 206b, 206c, 206d, and 206e.

A recording medium 208 such as a memory card, a CD, and a DVD can be removably mounted on the recording medium I/F 207. The recording medium I/F 207 reads out data from the mounted recording medium 208 and writes data into the recording medium 208 on the basis of the control of the CPU 201. The recording medium 208 stores therein data of an image and the like to be displayed on the display 205. The external I/F 209 is an interface that is connected to external devices by a wired cable (a USB cable and the like) or wirelessly connected to the external devices and is for performing inputting and outputting (data communication) of video signals and sound signals. The communication I/F 210 is an interface for performing transmission and reception (data communication) of various data such as files and commands by communicating (wirelessly communicating) with external devices and Internet 211.

The sound output unit 212 outputs the sound of the moving image and music data to be played on the display control apparatus 200, operation sounds, ringtones, various notification sounds, and the like. The sound output unit 212 includes the sound output terminal 212a to which an earphone and the like are connected and the speaker 212b, but the sound output unit 212 may output sound data to an external speaker through wireless communication and the like.

The posture detection unit 213 detects the posture (tilt) of the display control apparatus 200 with respect to the direction of gravity and the posture of the display control apparatus 200 with respect to the axes in the yaw direction, the pitch direction, and the roll direction, and notifies the CPU 201 of the posture information. It can be determined whether the display control apparatus 200 is vertically held, horizontally held, facing upward, facing downward, or is in an oblique posture on the basis of the posture detected by the posture detection unit 213. The existence and degree of tilt of the display control apparatus 200 in the rotation directions such as the yaw direction, the pitch direction, and the roll direction, and whether the display control apparatus 200 has rotated in the rotation direction can be determined. One sensor or a combination of a plurality of sensors out of an accelerometer, a gyro sensor, a geomagnetic sensor, an azimuth sensor, an altitude sensor, and the like can be used as the posture detection unit 213.

As described above, the operation portions 206 include the touch panel 206a. The touch panel 206a is a planar input device that is formed to overlap with the display 205 and outputs coordinate information in accordance with the touched position. The CPU 201 can detect the following operations performed on the touch panel 206a and states of the touch panel 206a.

a finger or a pen that has not been touching the touch panel 206a newly touches the touch panel 206a, that is, the touching starts (hereinafter referred to as "Touch-Down")

a state (hereinafter referred to as "Touch-On") in which a finger or a pen is touching the touch panel 206a a finger or a pen is moving while touching the touch panel 206a (hereinafter referred to as "Touch-Move")

a finger or a pen that has been touching the touch panel 206a leaves the touch panel 206a, that is, the touching ends (hereinafter referred to as "Touch-Up")

a state (hereinafter referred to as "Touch-Off") in which nothing is touching the touch panel 206a When the Touch-Down is detected, the Touch-On is simultaneously detected. After the Touch-Down, the Touch-On is continuously detected in normal cases unless the touch up is detected. The Touch-On is also simultaneously detected when the Touch-Move is detected. Even when the Touch-On is detected, the Touch-Move is not detected if the touch position is not moving. The Touch-Off is detected when the Touch-Up of all touching fingers or pens is detected.

The CPU 201 is notified of those operations and states and the position coordinates at which a finger or a pen is touching the touch panel 206a through the internal bus, and the CPU 201 determines the type of the operation (touch operation) that has been performed on the touch panel 206a on the basis of the information of which notification has been given. For the Touch-Move, the moving direction of a finger or a pen moving on the touch panel 206a can also be determined for vertical components and horizontal components on the touch panel 206a on the basis of the change in the position coordinates. When a Touch-Move of at least a predetermined distance is detected, it is determined that a slide operation is performed. The Touch-Move is a moving operation performed on the touch panel 206a by the user. Various processing in accordance with the Touch-Move described below can also be performed in accordance with a dragging operation by a mouse that is also a moving operation.

An operation of quickly moving a finger for some distance while touching the touch panel 206a and then releasing the finger is referred to a flick. In other words, the flick is an operation of quickly tracing the touch panel 206a so as to flick the finger at the touch panel 206a, It can be determined that a flick is performed (it can be determined that a flick is performed after the slide operation) when it is determined that Touch-Move is performed for at least a predetermined distance and at at least a predetermined speed and Touch-Up is detected thereafter.

A touch operation of simultaneously touching a plurality of places (for example, two points) and causing the touch positions to approach each other is referred to as a pinch in, and a touch operation of causing the touch positions to be separated from each other is referred to as a pinch out. The pinch out and the pinch in are collectively referred to as a pinch operation (or simply as pinching). As the touch panel 206a, any of various types of touch panels such as a resistive film touch panel, a capacitive touch panel, surface acoustic wave touch panel, an infrared ray touch panel, an electromagnetic induction touch panel, an image recognition touch panel, and a light sensor touch panel may be used. There are also types that detect a touch in accordance with a contact with the touch panel, and types that detect a touch when a finger or a pen approaches the touch panel, but the touch panel may be any of the types.

Figure 2C:
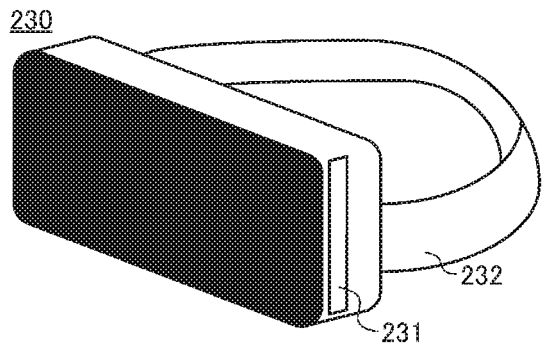

FIG. 2C is an external view of VR goggles (head mounted adapter) 230 on which the display control apparatus 200 can be mounted. The display control apparatus 200 can be used as a head mounted display by being mounted on the VR goggles 230. An insertion slot 231 is an insertion slot into which the display control apparatus 200 is inserted. The entire display control apparatus 200 can be inserted into the VR goggles 230 so that the display surface of the display 205 faces the side (that is, the user side) of a headband 232 for fixing the VR goggles 230 to the head of the user. The user can visually recognize the display 205 without holding the display control apparatus 200 with hands in a state in which the VR goggles 230 in which the display control apparatus 200 is mounted are worn on the head. In this case, when the user moves the head or the entire body, the posture of the display control apparatus 200 also changes. The posture detection unit 213 detects the change in the posture of the display control apparatus 200 at this time, and the CPU 201 performs processing for performing the VR display on the basis of the posture change. In this case, the detection of the posture of the display control apparatus 200 by the posture detection unit 213 is equivalent to the detection of the posture (the direction toward which the gaze of the user is directed) of the head of the user. The display control apparatus 200 itself may be an HMD that can reach the head without the VR goggles.

Figure 3:
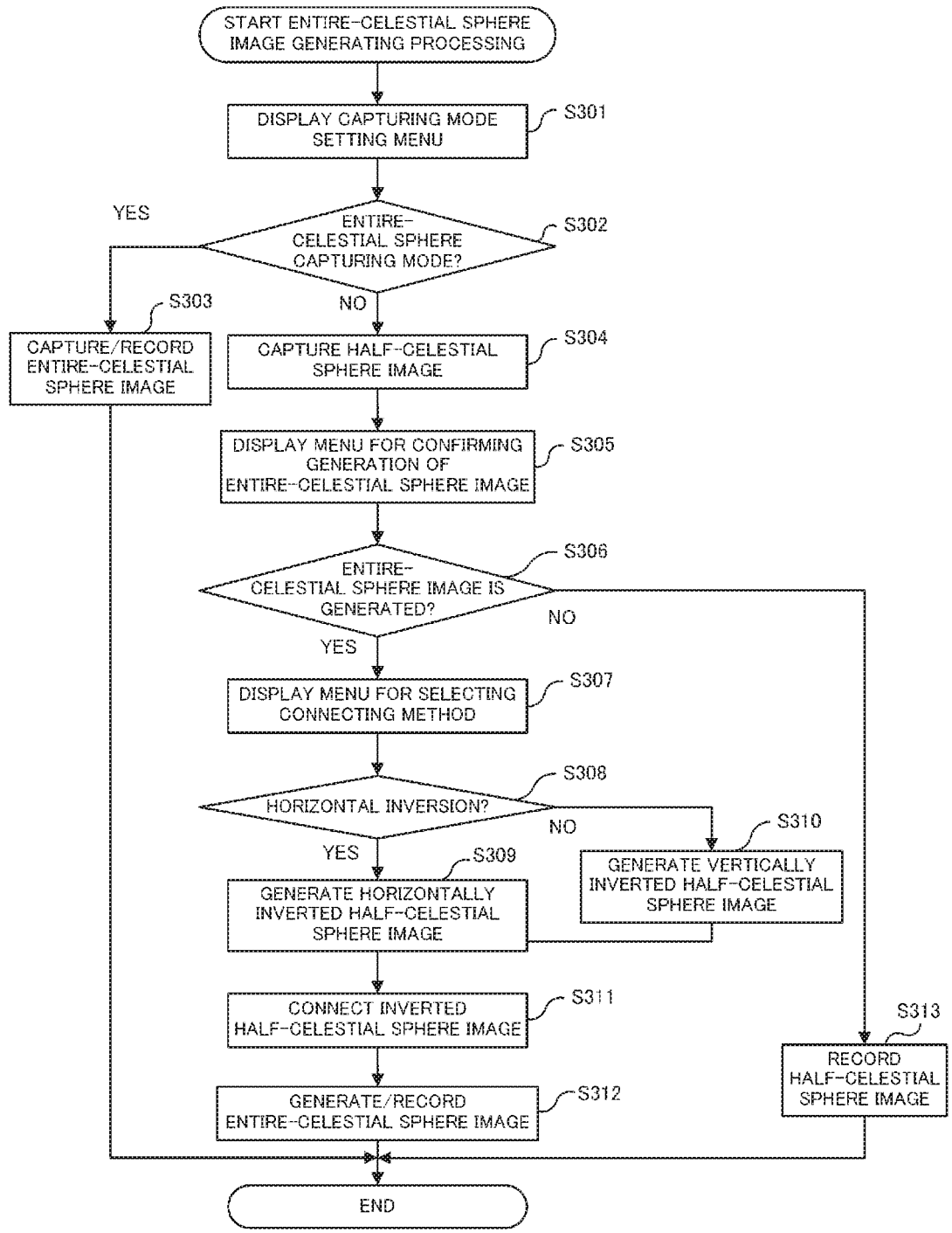
FIG. 3 is a flowchart that exemplifies entire-celestial sphere image generating processing according to Embodiment 1.

FIG. 3 is a flowchart that exemplifies entire-celestial sphere image generating processing according to Embodiment 1. Embodiment 1 illustrates an example of generating an entire-celestial sphere image from a half-celestial sphere image captured with use of the digital camera 100. For example, the digital camera 100 generates a half-celestial sphere image by copying a captured half-celestial sphere image (an original half-celestial sphere image with which generation is performed) and horizontally (in the horizontal direction) or vertically (in the vertical direction) inverting the copied half-celestial sphere image, and generates (combines) an entire-celestial sphere image by connecting the half-celestial sphere image to the original half-celestial sphere image with which generation is performed. The copying and inversion of the original half-celestial sphere image with which generation is hereinafter referred to as inversion and copying.

The horizontal inversion of the half-celestial sphere image means to invert one of the half-celestial sphere images obtained by splitting a celestial sphere surface into two at the vertical surface so that the half-celestial sphere image is plane symmetrical to the vertical surface. The vertical inversion of the half-celestial sphere image means to invert one of the half-celestial sphere images obtained by splitting the celestial sphere surface into two at the horizontal surface so that the half-celestial sphere image is plane symmetrical to the horizontal surface. The connection of the inverted half-celestial sphere image with the original half-celestial sphere image with which generation is performed means to connect the images so as to connect the borders of the half-celestial sphere images so that the corresponding positions (plane-symmetrical positions) are adjacent to each other. As described above, the digital camera 100 can improve the appearance of the portions that are connected to each other and suppress the feeling that something is wrong by connecting the borders of the half-celestial sphere images to be connected at corresponding positions.

In the description below, an example in which the celestial sphere surface is split into two at the vertical surface or the horizontal surface is described, but the present invention is not limited thereto. The digital camera 100 may invert one of the half-celestial sphere images obtained by splitting a celestial sphere surface into two at a surface that forms a freely-selected angle with the vertical surface or the horizontal surface so that the half-celestial sphere image is plane-symmetrical to the surface.

The entire-celestial sphere image generating processing according to Embodiment 1 starts when power supply is provided to the digital camera 100, for example. When power supply is provided to the digital camera 100, the program recorded on the non-volatile memory 56 is expanded in the system memory 52, and the system control unit 50 controls the operation of the digital camera 100 by executing the program of the entire-celestial sphere image generating processing.

Figure 5:
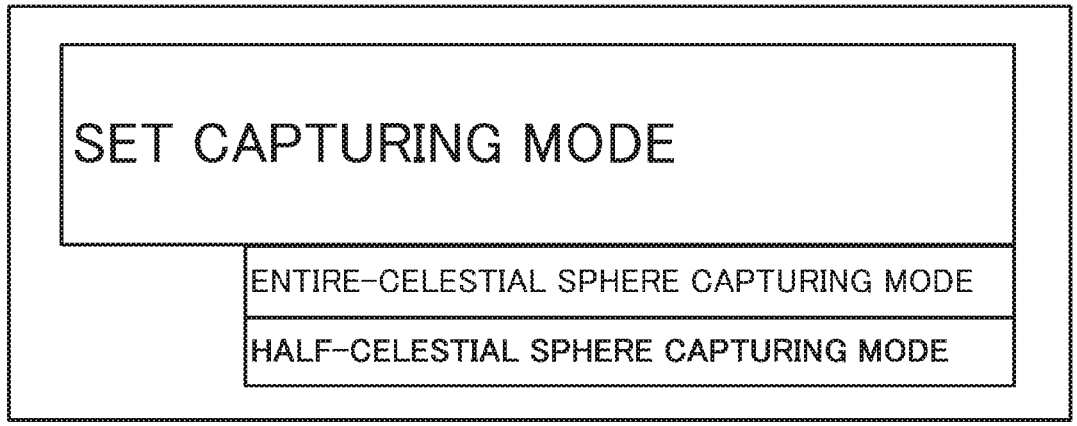
FIG. 5 is one example of a menu screen for setting a capturing mode.

In Step S301, the system control unit 50 displays a menu for letting the user to set the capturing mode on the display unit 28. FIG. 5 is one example of a menu screen for setting the capturing. In FIG. 5, as the capturing mode, an "entire-celestial sphere capturing mode" and a "half-celestial sphere capturing mode" are exemplified. The example of FIG. 5 illustrates a state in which the half-celestial sphere capturing mode is selected.

In Step S302, the system control unit 50 determines whether the entire-celestial sphere capturing mode is selected by the user operation in Step S301. The processing proceeds to Step S303 when the entire-celestial sphere capturing mode is selected. When the entire-celestial sphere capturing mode is not selected, that is, when the half-celestial sphere capturing mode is selected, the processing proceeds to Step S304.

In Step S303, the system control unit 50 causes the capturing mode of the digital camera 100 to transition to an entire-celestial sphere image capturing mode. The system control unit 50 captures an entire-celestial sphere image by the capturing units 22*a* and 22*b* (corresponding to image capturing means), and records the captured entire-celestial sphere image on the recording medium 90. The recording medium 90 corresponds to a recording memory. The system control unit 50 may record the captured entire-celestial sphere image on the recording medium 90 in association with attribute information indicating that the captured entire-celestial sphere image is an entire-celestial sphere image that is unchanged from when the entire-celestial sphere image is captured and "is not a combined image".

In Step S304, the system control unit 50 causes the capturing mode of the digital camera 100 to transition to a half-celestial sphere image capturing mode. The system control unit 50 captures a half-celestial sphere capture image by the capturing units 22*a* and 22*b*.

Figure 6:
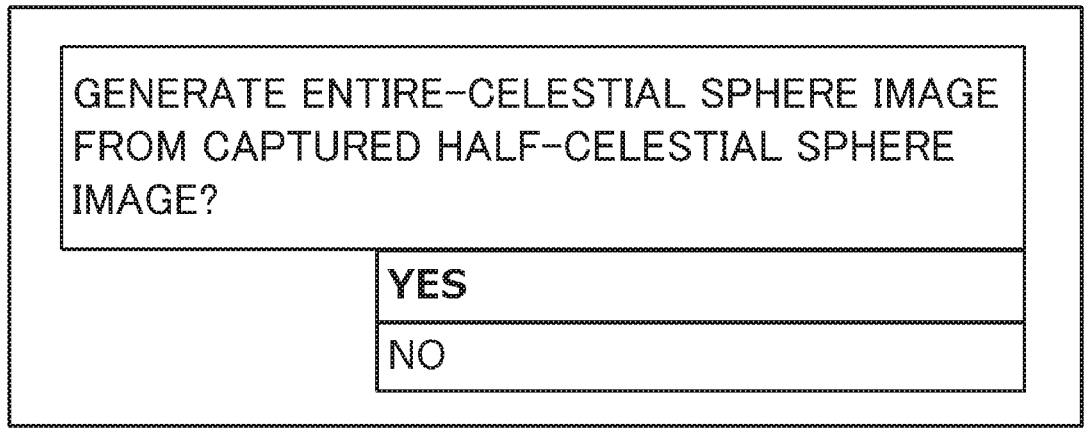
FIG. 6 is one example of a menu screen for confirming whether an entire-celestial sphere image is to be generated.

In Step S305, the system control unit 50 displays a menu for confirming with the user whether an entire-celestial sphere image is to be generated from the captured half-celestial sphere image on the display unit 28. FIG. 6 is one example of the menu screen confirming whether the entire-celestial sphere image is to be generated. The example of FIG. 6 illustrates a state in which "yes" is selected for confirmation of whether the entire-celestial sphere image is to be generated from the captured half-celestial sphere image. The captured half-celestial sphere image is a half-celestial sphere image serving as the original with which the entire-celestial sphere image is generated, and corresponds to a first half-celestial sphere image. The system control unit 50 functions as acquisition means for acquiring the captured half-celestial sphere image.

In Step S306, the system control unit 50 determines whether to generate an entire-celestial sphere image from the half-celestial sphere image. The system control unit 50 can determine to generate the entire-celestial sphere image when the user selects "yes" for the confirmation of whether to generate an entire-celestial sphere image from the half-celestial sphere image in Step S305. When the user selects "no", the system control unit 50 can determine not to generate an entire-celestial sphere image. When it is determined that an entire-celestial sphere image is to be generated from the halt-celestial sphere image by the user operation, the processing proceeds to Step S307. When it is determined that an entire-celestial sphere image is not to be generated from the half-celestial sphere image by the user operation, the processing proceeds to Step S313.

Figure 7:
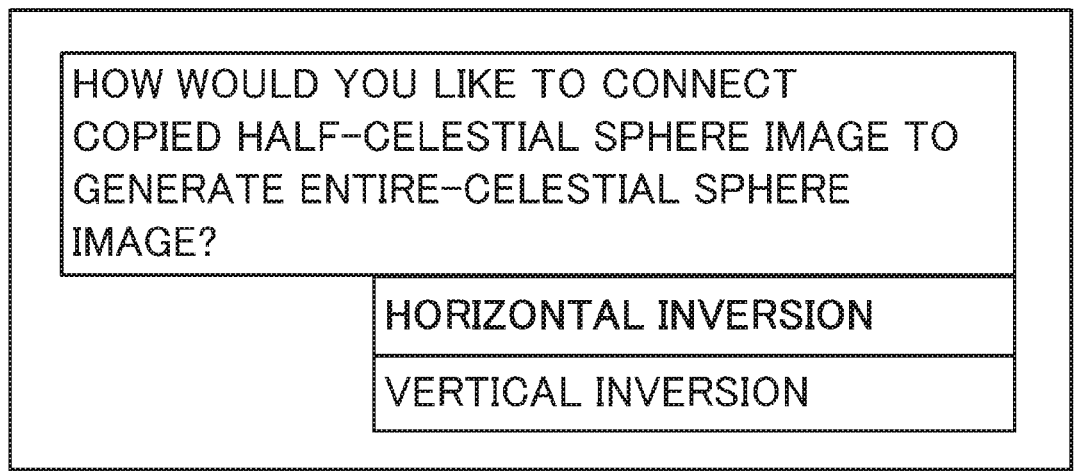
FIG. 7 is one example of a menu screen for selecting a method for connecting half-celestial sphere images together.

In Step S307, the system control unit 50 displays a menu for letting the user to select how to connect the half-celestial sphere image captured in Step S304 and the half-celestial sphere image obtained by copying the captured half-celestial sphere image together in order to generate the entire-celestial sphere image on the display unit 28. FIG. 7 is one example of a menu screen for selecting the method of connecting the half-celestial sphere images together. FIG. 7 exemplifies "horizontal inversion" and "vertical inversion" as the methods of connecting the half-celestial sphere images together. The example of FIG. 7 illustrates a state in which the horizontal inversion is selected as the method of connecting the half-celestial sphere images together.

In Step S308, the system control unit 50 determines whether the horizontal inversion is selected as the method of connecting the half-celestial sphere images together by the user operation on the menu screen in FIG. 7. When the horizontal inversion is selected, the processing proceeds to Step S309. When the horizontal inversion is not selected, that is, when the vertical inversion is selected, the processing proceeds to Step S310.

In Step S309, the image processing unit 24 generates a half-celestial sphere image obtained by the horizontally copying and inverting the half-celestial sphere image captured in Step S304. In Step S310, the image processing unit 24 generates a half-celestial sphere image obtained by vertically copying and inverting the half-celestial sphere image captured in Step S304. The half-celestial sphere image generated in Step S309 or Step S310 corresponds to a second half-celestial sphere image.

In Step S311, the image processing unit 24 connects the half-celestial sphere image generated by the horizontal or vertical inversion and copying in Step S309 or Step S310 to the half-celestial sphere image captured in Step S304.

In Step S312, the image processing unit 24 generates an entire-celestial sphere image, and records the generated (combined) entire-celestial sphere image on the recording medium 90. The image processing unit 24 records the generated entire-celestial sphere image on the recording medium 90 in association with attribute information indicating that "a plurality of images are combined". The attribute information may further indicate that "the image is acquired by combining a plurality of image at the time of capturing". The attribute information is used in display processing for list display illustrated in FIG. 11 described below. The image processing unit 24 records the generated entire-celestial sphere image on the recording medium 90 in association with region information indicating the position of at least one of the regions of the original half-celestial sphere image with which generation is performed and the region of the copied and inverted half-celestial sphere image in the generated entire-celestial sphere image. The region information is used in display processing for the screen illustrated in FIG. 12 described below. The image processing unit 24 functions as generation means and combining means for executing the processing from Step S308 to Step S312.

In Step S313, the system control unit 50 records the half-celestial sphere image captured in Step S304 on the recording medium 90. The recording medium 90 can also record images other than the entire-celestial sphere image thereon. The system control unit 50 may record the captured half-celestial sphere image on the recording medium 90 together with the attribute information indicating that the image is a captured half-celestial sphere image. The system control unit 50 functions as recording means for executing the processing of Step S303, Step S312, and Step S313.

Embodiment 1 describes an example of the application to the entire-celestial sphere camera including a plurality of capturing units, but this embodiment can also be applied to a wide-angle camera (half-celestial sphere camera) in which the capturing range of the capturing unit is a wide range of at least 180 degrees in the vertical and horizontal directions. In this case, the entire-celestial sphere image is generated by processing similar to that in Step S304 to Step S313 in FIG. 3.

The generated entire-celestial sphere image may be transmitted to the display control apparatus 200 via the communication I/F 210 and displayed on the display 205.

In Embodiment 1, the digital camera 100 generates the entire-celestial sphere image by connecting the half-celestial sphere image, which is obtained by duplicating the captured half-celestial sphere image (original half-celestial sphere image with which generation is performed/original half-celestial sphere image) and horizontally or vertically inverting the duplicated half-celestial sphere image, to the original half-celestial sphere image with which generation is performed. The inverted and copied half-celestial sphere image is connected to the original half-celestial sphere image with which generation is performed, and hence the appearance of the seam in the generated entire-celestial sphere image is excellent, and the feeling that something is wrong is suppressed. As described above, the digital camera 100 can enhance the immersive feeling of the entire-celestial sphere image generated from the half-celestial sphere image by improving the appearance of the seam in the entire-celestial sphere image and suppressing the feeling that something is wrong.

The digital camera 100 generates the entire-celestial sphere image from the half-celestial sphere image containing the object to be captured by the user. Therefore, the user can prevent the generated entire-celestial sphere image from including unintended objects.

Embodiment 2

Embodiment 1 has described an example in which an entire-celestial sphere image is generated from a captured half-celestial sphere image when the user captures the image with the digital camera 100. Meanwhile, Embodiment 2 describes an example in which an entire-celestial sphere image is generated on the basis of an entire-celestial sphere image or a half-celestial sphere image recorded on the recording medium 90 connected to the digital camera 100. The configuration of the digital camera 100 in Embodiment 2 is similar to that of Embodiment 1, and hence description thereof is omitted.

Figure 4:
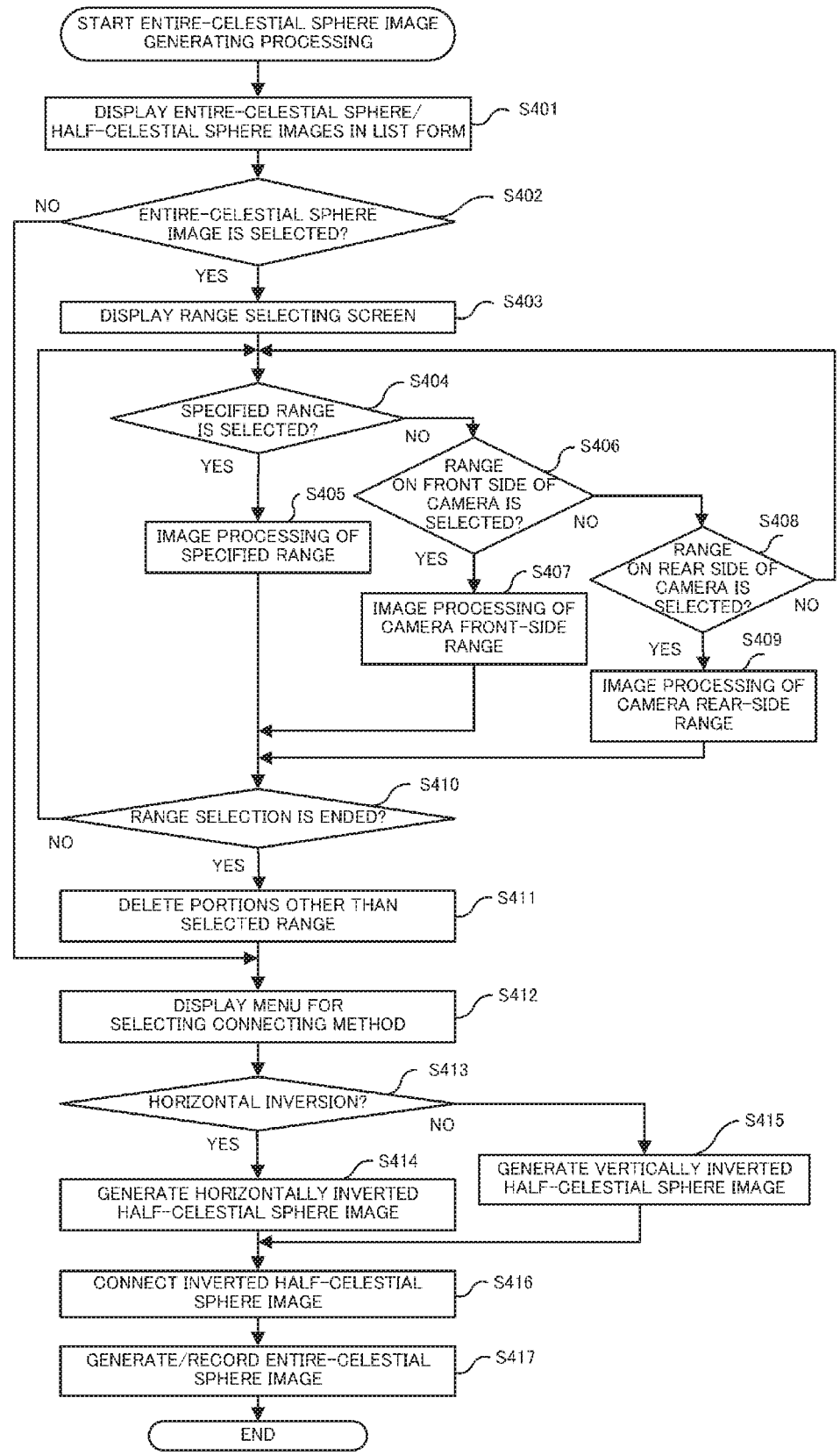
FIG. 4 is a flowchart exemplifying entire-celestial sphere image generating processing according to Embodiment 2.

FIG. 4 is a flowchart that exemplifies entire-celestial sphere image generating processing according to Embodiment 2. The digital camera 100 acquires recorded entire-celestial sphere images and half-celestial sphere images from the recording medium 90 connected thereto, and generates an entire-celestial sphere image on e basis of the acquired image.

In Step S401, the system control unit 50 distinguishes the entire-celestial sphere images and the half-celestial sphere images from the images recorded on the recording medium 90. The system control unit 50 can distinguish the attributes indicating whether the image is an entire-celestial sphere image or a half-celestial sphere image on the basis of the attribute information recorded together with the image data. The system control unit 50 displays a list of the distinguished entire-celestial sphere images and half-celestial sphere images, and causes the user to select the original image with which the entire-celestial sphere image is generated.

Figure 8:
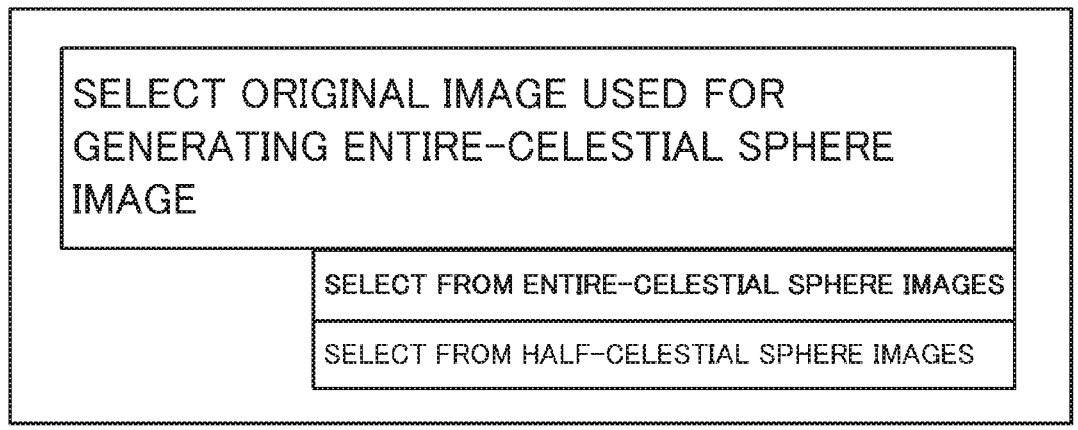
FIG. 8 is one example of a menu screen for selecting the type of an original image with which the entire-celestial sphere image is generated.

Now, an example of processing of causing the user to select the original image with which the entire-celestial sphere image is generated is described. First, the system control unit 50 displays a menu for causing the user to select whether to select the original image with which the entire-celestial sphere image is generated from ala entire-celestial sphere image or from a half-celestial sphere image on the display unit 28. FIG. 8 is one example of a menu screen for selecting the type of the original image used for generating the entire-celestial sphere image. In FIG. 8, "select from entire-celestial sphere images" and "select from half-celestial sphere images" are exemplified as choices of the types of the original images with which the entire-celestial sphere image is generated. In the example in FIG. 8, a state in which a case where the image is selected from the entire-celestial sphere images is selected as the type of the original image used for generating the entire-celestial sphere image is indicated.

In the menu screen in FIG. 8, when the user selects "select from entire-celestial sphere images", the system control unit 50 displays a list of the entire-celestial sphere images recorded on the recording medium 90 on the display unit 28. Meanwhile, when the user selects "select from half-celestial sphere images", the system control unit 50 displays a list of the half-celestial sphere images recorded on the recording medium 90 on the display unit 28. The user selects the original image used for generating the entire-celestial sphere image to be generated from the list of the entire-celestial sphere images or the half-celestial sphere images displayed on the display unit 28.

In Step S402, the system control unit 50 determines whether the image selected by the user as the original for generation in Step S401 is an entire-celestial sphere image. When the image selected by the user is an entire-celestial sphere image, the processing proceeds to Step S403. When the image selected by the user is a half-celestial sphere image, the processing proceeds to Step S412.

Figure 9:
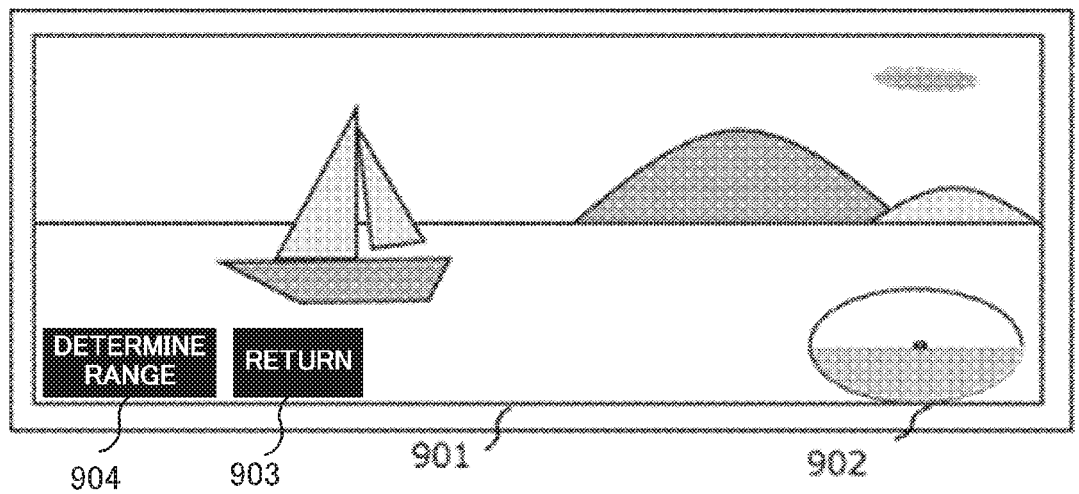
FIG. 9 is one example of a range selecting screen for the half-celestial sphere image.

In Step S403, the system control unit 50 switches the display unit 28 to an editing screen of the entire-celestial sphere image. Then, the system control unit 50 displays a range selecting screen 901 for the half-celestial sphere image on the display unit 28. FIG. 9 is one example of the range selecting screen for the half-celestial sphere image. The range selecting screen 901 for the half-celestial sphere image in FIG. 9 displays a part (half-celestial sphere image) of the entire-celestial sphere image selected by the user in Step S402. An icon 902 indicates which portion out of the entire-celestial sphere image selected by the user is displayed on the range selecting screen 901.

A "return" button 903 is a button for returning to the list display screen in Step S401. When the user operates (pushes, touches, or the like) the "return" button 903, the system control unit 50 displays the entire-celestial sphere image list, the half-celestial sphere image list, or the entire-celestial sphere and the half-celestial sphere image list displayed in Step S401 on the display unit 28.

A "range determination" button 904 is a button for determining the range of the half-celestial sphere image serving as the original for generation for the entire-celestial sphere image selected in Step S401. When the user operates the "range determination" button 904, the system control unit 50 can determine the range displayed on the range selecting screen 901 as the range of the half-celestial sphere image selected by the user. The user can change the range of the half-celestial sphere image displayed on the range selecting screen 901 by operating the operation portions 70.

In Step S404, the system control unit 50 determines whether the user has selected the half-celestial sphere image (excluding the ranges of the half-celestial sphere image on the front side of the camera or the rear side of the camera) in the range specified by the user in the entire-celestial sphere image selected by the user in Step S401. When the user has selected the half-celestial sphere image in the specified range, the processing proceeds to Step S405. When the user has not selected the half-celestial sphere image in the specified range, the processing proceeds to Step S406. In Step S405, the image processing unit 24 performs processing by considering the half-celestial sphere image in the specified range as the half-celestial sphere image to be copied.

In Step S406, the system control unit 50 determines whether the user has selected a half-celestial sphere image captured by the front side of the camera. The half-celestial sphere image captured by the front side of the camera is a half-celestial sphere image captured by the front camera unit, and is hereinafter also referred to as a front-side half-celestial sphere image. When the user has selected the front-side half-celestial sphere image, the processing proceeds to Step S407. When the user has not selected the front-side half-celestial sphere image, the processing proceeds to Step S408. In Step S407, the image processing unit 24 processes the front-side half-celestial sphere image as a half-celestial sphere image to be copied.

In Step S408, the system control unit 50 determines whether the user has selected a half-celestial sphere image captured by the rear side of the camera. The half-celestial sphere image captured by the rear side of the camera is a half-celestial sphere image captured by the rear camera unit, and is hereinafter also referred to as a rear-side half-celestial sphere image. When the user has selected the rear-side half-celestial sphere image, the processing proceeds to Step S409. When the user has not selected the rear-side half-celestial sphere image, the processing returns to Step S404. In Step S409, the image processing unit 24 processes the rear-side half-celestial sphere image as the half-celestial sphere image to be copied.

In Step S410, the system control unit 50 determines whether the user has ended the selection of the range of the half-celestial sphere image. The system control unit 50 can determine whether the selection of the range of the half-celestial sphere image has ended in accordance with whether the user has operated (pushed and the like) the "range determination" button 904 on the range selecting screen 901. When the user has ended the selection of the range of the half-celestial sphere image, the processing proceeds to Step S411. When the user has not ended the selection of the range of the half-celestial sphere image, the processing returns to Step S404.

In Step S411, the image processing unit 24 deletes portions other than the range of the half-celestial sphere image selected in Step S403 to Step S410 for the entire-celestial sphere image selected by the user in Step S401.

In Step S412 to Step S417, the image processing unit 24 generates a half-celestial sphere image (second half-celestial sphere image) obtained by copying the original half-celestial sphere image (first half-celestial sphere image) with which generation is performed, and generates an entire-celestial sphere image by connecting the half-celestial sphere image to the original half-celestial sphere image with which generation is performed. In the description from Step S412 to Step S417, when the user selects the entire-celestial sphere image in Step S402, the original half-celestial sphere image with which generation is performed is the half-celestial sphere image in the range selected by the user in the processing from Step S403 to Step S410. When the user selects the half-celestial sphere image in Step S402, the original half-celestial sphere image with which generation is performed is described as the half-celestial sphere image selected by the user in Step S402.

In Step S412, the system control unit 50 displays a menu for the user to select how to connect the original half-celestial sphere image with which generation is performed and the half-celestial sphere image obtained by copying the above together in order to generate the entire-celestial sphere image on the display unit 28. When the user selects the half-celestial sphere image in Step S402, the system control unit 50 displays a menu screen illustrated in FIG. 7. Meanwhile, when the user selects the entire-celestial sphere image in Step S402, the system control unit 50 displays a menu screen illustrated in FIG. 10.

Figure 10:
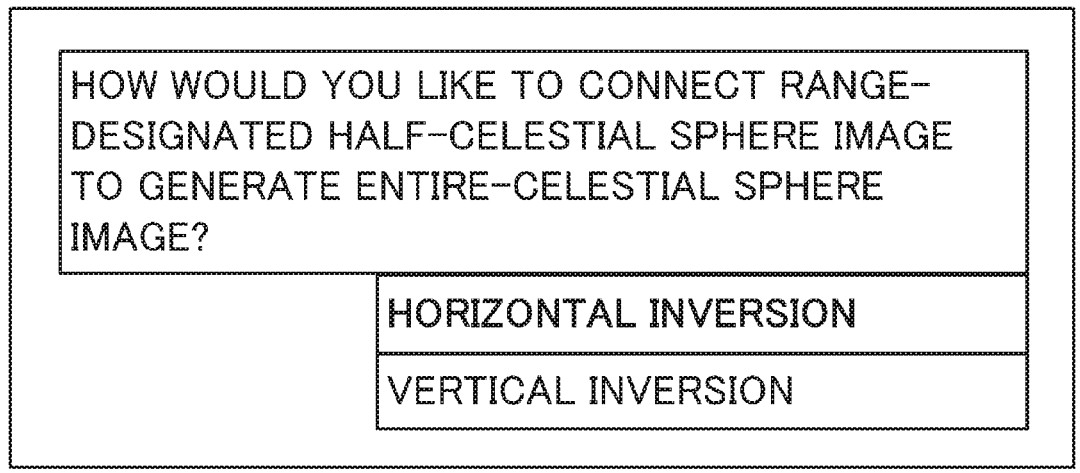
FIG. 10 is one example of a menu screen for selecting a method for connecting the half-celestial sphere images together.

FIG. 10 is one example of a menu screen for the method of connecting the half-celestial sphere images together. In FIG. 10, "horizontal inversion" and "vertical inversion" are exemplified as methods of connecting the half-celestial sphere images of which ranges are selected by the user in the processing from Step S403 to Step S410 together. In the example of FIG. 10, a state in which the horizontal inversion is selected as the method of connecting the half-celestial sphere images together is illustrated.

In Step S413, the system control unit 50 determines whether the horizontal inversion is selected as the method of connecting the half-celestial sphere images together from the user operation in Step S412. When the horizontal inversion is selected, the processing proceeds to Step S414. When the horizontal inversion is not selected, that is, when the vertical inversion is selected, the processing proceeds to Step S415.

In Step S414, the image processing unit 24 generates a half-celestial sphere image by copying the original half-celestial sphere image with which generation is performed and horizontally inverting the original half-celestial sphere image. In Step S415, the image processing unit 24 generates a half-celestial sphere image by copying the original half-celestial sphere image with which generation is performed and vertically inverting the original half-celestial sphere image.

In Step S416, the image processing unit 24 connects the generated half-celestial sphere image obtained by the horizontal or vertical inversion and copying in Step S414 or Step S415 to the original half-celestial sphere image with which generation is performed. In Step S417, the image processing unit 24 generates an entire-celestial sphere image, and records the generated entire-celestial sphere image on the recording medium 90. The image processing unit 24 records the generated entire-celestial sphere image on the recording medium 90 in association with the attribute information indicating that "a plurality of images are combined". The attribute information is used in the display processing for the list display illustrated in FIG. 11 described below. In this embodiment, the plurality of images are combined after the capturing, and hence the generated entire-celestial sphere image is not recorded in association with the attribute information indicating that the image is "acquired by combining a plurality of images at the time of capturing". The image processing unit 24 records the generated entire-celestial sphere image on the recording medium 90 in association with the region information indicating the region of the original half-celestial sphere image with which generation is performed and the region of the copied and inverted half-celestial sphere image out of the generated entire-celestial sphere image. The region information is used in the display processing for a screen illustrated in FIG. 12 described below. The image processing unit 24 functions here as recording means for executing the processing in Step S417.

Figure 11:
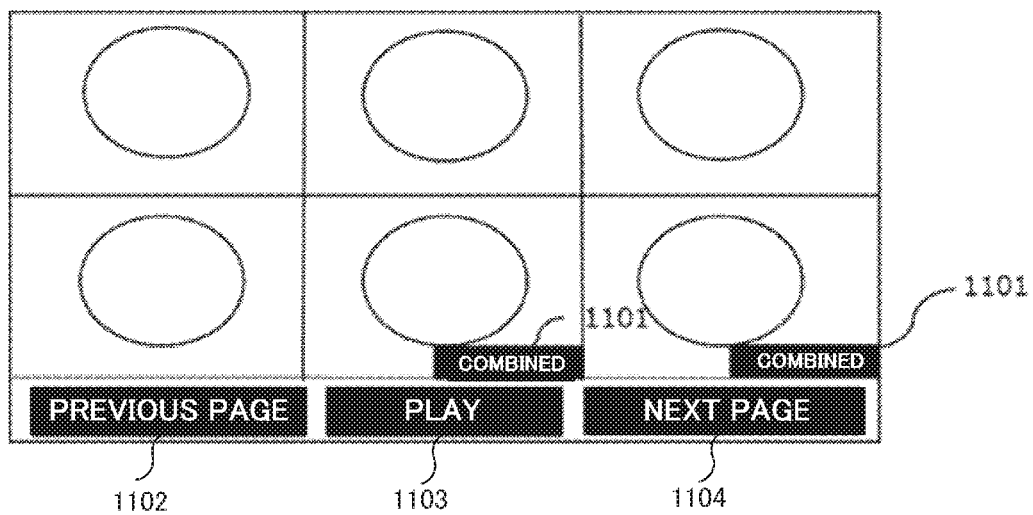
FIG. 11 is a list display example of captured images and generated entire-celestial sphere images.
Figure 12:
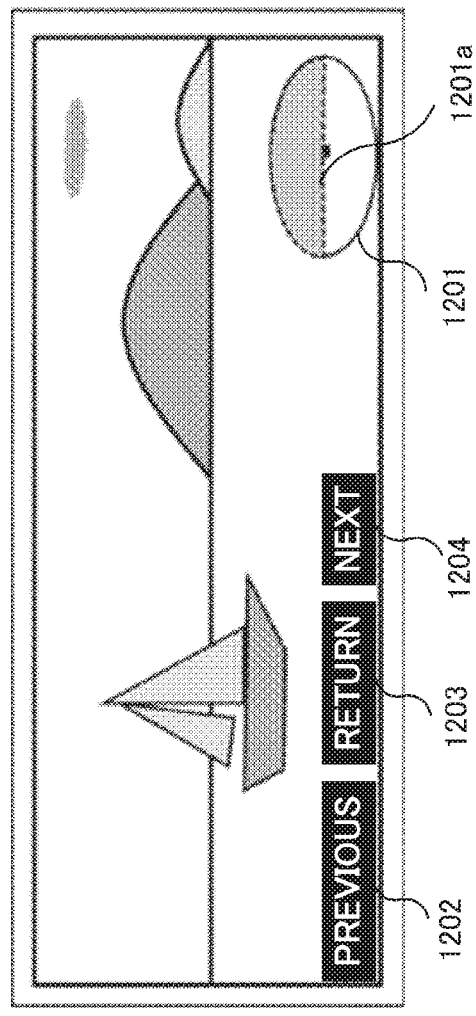
FIG. 12 is a screen example for displaying a portion generated by inversion and copying in the entire-celestial sphere image.

FIG. 11 and FIG. 12 exemplify screens for reproducing the entire-celestial sphere image recorded on the recording medium 90 on the display unit 28. The recording medium 90 records entire-celestial sphere images (entire-celestial sphere images recorded in a normal manner) captured by the digital camera 100 and entire-celestial sphere images generated from half-celestial sphere images by the digital camera 100. The captured images and the generated images are mixed in the recording medium 90. Therefore, the system control unit 50 performs display so that the entire-celestial sphere image played by the user that is an image unchanged from when the image is captured and the entire-celestial sphere image played by the user that is an image generated by combining captured images can be distinguished from each other. The system control unit 50 functions as display controlling means.

FIG. 11 is an example of list display of the captured half-celestial sphere images, the captured entire-celestial sphere images, and the generated entire-celestial sphere images. In the example of FIG. 11, six images are displayed in a list form (including thumbnail display). The system control unit 50 displays an icon 1101 indicating "combined entire-celestial sphere" on an entire-celestial sphere image that is an entire-celestial sphere picture of which attribute information indicates that the image is acquired by combining a plurality of images out of the images recorded on the recording medium 90. As a result, the user can easily distinguish half-celestial sphere images and entire-celestial sphere images that are unchanged from when the images are captured, and entire-celestial sphere images generated by connecting half-celestial sphere images together from each other.

When the user operates a "previous page" button 1102, the system control unit 50 displays the list page before the displayed list page. When the user operates a "next page" button 1104, the system control unit 50 displays a list page after the displayed list page. When the user operates a "play" button 1103, the system control unit 50 reproduces the entire-celestial sphere image selected from the displayed list.

FIG. 12 is an example of a screen displaying a portion generated by inversion and copying in the entire-celestial sphere image. When the user selects an entire-celestial sphere image on which the "combined entire-celestial sphere" icon 1101 is displayed and operates "play" button 1103 on the list screen illustrated in FIG. 11, for example, the system control unit 50 can display the screen exemplified in FIG. 12. FIG. 12 is an example displaying a portion generated by inverting and copying the original half-celestial sphere image with which generation is performed. An icon 1201 indicates the range corresponding to the displayed portion out of the generated entire-celestial sphere image. A portion 1201a enclosed by a dotted line indicates that the portion is generated by inversion and copying. By enclosing the portion generated by inversion and copying by a dotted line, the user can distinguish the portion that is unchanged from when portion is captured and the portion generated by performing inversion and copying by the image processing unit 24 from each other. The system control unit 50 performs control so that the portion corresponding to the range generated by inversion and copying is displayed by being enclosed by a dotted line on the basis of the region information stored in association with the entire-celestial sphere image. The portion corresponding to the range generated by inversion and copying does not necessarily need to be displayed by being enclosed by a dotted line, and a portion unchanged from when the portion is captured may be displayed by being enclosed by a dotted line.

When the user operates a "previous" button 1202, the system control unit 50 displays an image that is before the displayed entire-celestial sphere image by one image. When the user operates a "next" button 1204, the system control unit 50 displays an image that is after the displayed entire-celestial sphere image by one image. When the user operates a "return" button 1203, the system control unit 50 displays the list screen illustrated in FIG. 11.

Embodiment 2 describes an example in which the digital camera 100 generates the entire-celestial sphere image on the basis of the entire-celestial sphere images or the half-celestial sphere images acquired from the recording medium 90, and an example in which the display unit 28 displays the entire-celestial sphere images and the half-celestial sphere images acquired from the recording medium 90. This embodiment is not limited thereto, and can be applied to the display control apparatus 200. In other words, the display control apparatus 200 may generate the entire-celestial sphere image on the basis of the entire-celestial sphere image or the half-celestial sphere image acquired from the recording medium 90 by the CPU 201. The display control apparatus 200 may display the entire-celestial sphere image and the half-celestial sphere image acquired from the recording medium 90 on the display 205 by the CPU 201.

In Embodiment 2, the digital camera 100 generates the entire-celestial sphere image on the basis of the entire-celestial sphere image or the half-celestial sphere image recorded on the recording medium 90. The user can generate the entire-celestial sphere image by selecting a desired image from the recorded images after the capturing, and hence convenience is improved.

The digital camera 100 displays the recorded images so that the entire-celestial sphere images generated by the image processing unit 24 out of the recorded images are distinguishable. The digital camera 100 can display the generated entire-celestial sphere images in a form in which the portions generated by the image processing unit 24 are distinguishable. Therefore, the user can easily tell the difference between the captured entire-celestial sphere images and the generated entire-celestial sphere images.

The various abovementioned controls described to be performed by the system control unit 50 or the image processing unit 24 may be performed by one hardware, or a plurality of hardware (for example, a plurality of processors and circuits) may perform the control of the entire apparatus by sharing the processing.

The present invention has been described in detail on the basis of the preferred embodiments thereof, but the present invention is not limited to those specific embodiments, and various forms are included in the present invention without departing from the gist of the present invention. Each of the abovementioned embodiments merely indicates one embodiment of the present invention, and the embodiments can be combined, as appropriate.

In the abovementioned embodiments, a case where the present invention is applied to the image capturing apparatus is described as an example, but the present invention is not limited to this example and can be applied to any apparatus that can display a VR image on a display unit. For example, the present invention can be applied to a personal computer, a PDA, a mobile phone terminal, a mobile image viewer, a printer apparatus including a display, a digital photo frame, a music player, a game console, a digital book reader, a video player, and the like. The present invention can also be applied to a digital camera, a television apparatus, a projector apparatus, a tablet terminal, an AI speaker, home appliances, an in-vehicle apparatus, and a medical equipment.

The present invention is not limited to the main body of the image capturing apparatus (digital camera 100), and the present invention can also be applied to a control apparatus that communicates with an image capturing apparatus (including a network camera) over wired or wireless communication and remotely controls the image capturing apparatus as in the display control apparatus 200 in the abovementioned embodiments. Apparatuses that remotely control the image capturing apparatus include apparatuses such as a smartphone, a tablet PC, and a desktop PC. The image capturing apparatus can be remotely controlled by providing a notification of a command that causes the image capturing apparatus to perform various operations and settings from the control apparatus side on the basis of the operation performed on the control apparatus side and the processing performed on the control apparatus side. The live view image captured by the image capturing apparatus may be received over wired or wireless communication and be displayed on the control apparatus side.

According to the present invention, the entire-celestial sphere image that provides a high immersive feeling can be generated by connecting the captured images together.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-021703, filed on Feb. 8, 2019, which is hereby incorporated by reference herein in its entirety.

What is claimed is:

1. An electronic device, comprising:
    a processor; and
    a memory storing a program which, when executed by the processor, causes the electronic device to:
        acquire a first entire-sphere image;
        select a range of the first entire-sphere image;
        perform control to display a part of the first entire-sphere image corresponding to the selected range of the first entire-sphere image on a screen, wherein the part of the first entire-sphere image is a first half-sphere image;
        generate a second half-sphere image by horizontally or vertically inverting the first half-sphere image;
        generate a second entire-sphere image by connecting the first half-sphere image and the second half-sphere image together; and
        record the second entire-sphere image on a recording memory.

2. The electronic device according to claim 1, further comprising:
    an image capturing unit for capturing the first entire-sphere image.

3. The electronic device according to claim 2, wherein the first entire-sphere image captured by the image capturing unit is recorded on the recording memory in association with attribute information indicating that the first entire-sphere image is not an image obtained by combining a plurality of images.

4. The electronic device according to claim 1, wherein the second entire-sphere image is recorded on the recording memory in association with attribute information indicating that the second entire-sphere image is an image obtained by combining a plurality of images.

5. The electronic device according to claim 4, wherein the second entire-sphere image is recorded on the recording memory in association with attribute information indicating that the second entire-sphere image is an image acquired by combining a plurality of images at time of capturing.

6. The electronic device according to claim 4, wherein:
    the recording memory includes an image other than the second entire-sphere image recorded thereon; and
    the program when executed by the processor further causes the electronic device to perform control to display a plurality of images recorded on the recording memory in a list form and display the second entire-sphere image on basis of the attribute information so that the second entire-sphere image is distinguishable.

7. The electronic device according to claim 1, wherein:
    region information indicating at least one of positions of a region of the first half-sphere image or a region of the second half-sphere image in the second entire-sphere image is further recorded on the recording memory in association with the second entire-sphere image; and
    the program when executed by the processor further causes the electronic device to display the second entire-sphere image on basis of the region information so that ranges of the first half-sphere image and the second half-sphere image are distinguishable from each other.

8. The electronic device according to claim 1, wherein the second entire-sphere image is generated in accordance with an instruction from a user.

9. The electronic device according to claim 1, wherein the second half-sphere image is generated by copying the first half-sphere image to obtain a first copied half-sphere image and inverting the first copied half-sphere image.

10. A method for controlling an electronic device, the method comprising:
    acquiring a first entire-sphere image;
    selecting a range of the first entire-sphere image;
    performing control to display a part of the first entire-sphere image corresponding to the selected range of the first entire-sphere image on a screen, wherein the part of the first entire-sphere image is a first half-sphere image;
    generating a second half-sphere image by horizontally or vertically inverting the first half-sphere image;
    generating a second entire-sphere image by connecting the first half-sphere image and the second half-sphere image together; and
    recording the second entire-sphere image on a recording memory.

11. A non-transitory computer readable medium that stores a program, wherein the program causes a computer to execute:
- acquiring a first entire-sphere image;
- selecting a range of the first entire-sphere image;
- performing control to display a part of the first entire-sphere image corresponding to the selected range of the first entire-sphere image on a screen, wherein the part of the first entire-sphere image is a first half-sphere image;
- generating a second half-sphere image by horizontally or vertically inverting the first half-sphere image;
- generating a second entire-sphere image by connecting the first half-sphere image and the second half-sphere image together; and
- recording the second entire-sphere image on a recording memory.

12. The electronic device according to claim 1, wherein the range of the first entire-sphere image is changed by a user operation.

* * * * *